(12) United States Patent
Takahashi (10) Patent No.: US 11,811,998 B2
(45) Date of Patent: Nov. 7, 2023

(54) IMAGE READING APPARATUS AND IMAGE FORMING APPARATUS HAVING A RECTANGULAR MIRROR AND A CASING FOR THE MIRROR AND AN IMAGE SENSOR, WHEREIN OPPOSITE ENDS OF THE MIRROR ARE BONDED TO THE CASING WITH ADHESIVES THAT DIFFER FROM EACH OTHER IN HARDNESS

(71) Applicant: CANON KABUSHIKI KAISHA, Tokyo (JP)

(72) Inventor: Toshio Takahashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 17/098,764

(22) Filed: Nov. 16, 2020

(65) Prior Publication Data

US 2021/0165339 A1 Jun. 3, 2021

(30) Foreign Application Priority Data

Nov. 29, 2019 (JP) ................................ 2019-216150

(51) Int. Cl.
*H04N 1/00* (2006.01)
*H04N 1/193* (2006.01)
(Continued)

(52) U.S. Cl.
CPC ......... *H04N 1/193* (2013.01); *H04N 1/02481* (2013.01); *H04N 23/55* (2023.01);
(Continued)

(58) Field of Classification Search
CPC ........... H04N 1/00814; H04N 1/00978; H04N 1/02481; H04N 1/193; H04N 2201/0246;
(Continued)

(56) References Cited

U.S. PATENT DOCUMENTS 6,339,214 B1 1/2002 Takakura et al. .......... 250/208.1
7,161,716 B1 1/2007 Kawasaki et al. ............ 358/497
(Continued)

FOREIGN PATENT DOCUMENTS

| JP | H04-3573 | 1/1992 |
|---|---|---|
| JP | H08-122600 | 5/1996 |

(Continued)

OTHER PUBLICATIONS

Office Action dated Aug. 8, 2023 in counterpart Japanese Application No. 2019-216150, together with English translation thereof.

*Primary Examiner* — Chad Dickerson
(74) *Attorney, Agent, or Firm* — Venable LLP (57) ABSTRACT

An image reading apparatus includes an original illuminator; a reflector for reflecting light reflected by the original; a reading portion for reading the light reflected by the reflector; a holding member holding the reflection member; a first bonding portion connecting the holding member and one end portion of the reflector in a direction along a reflecting surface of the reflection member; and a second bonding portion connecting the holding member and the other end portion of the reflector in the direction along the reflecting surface of the reflection member. The second bonding portion has a hardness less than that of the first bonding portion.

14 Claims, 5 Drawing Sheets

(51) Int. Cl.
*H04N 1/024* (2006.01)
*G03G 15/00* (2006.01)
*H04N 23/55* (2023.01)

(52) U.S. Cl.
CPC ............... *H04N 2201/0246* (2013.01); *H04N 2201/0247* (2013.01)

(58) Field of Classification Search
CPC ......... H04N 2201/0247; H04N 5/2254; G03G 15/60
USPC ........................................................ 358/483
See application file for complete search history.

(56) References Cited

U.S. PATENT DOCUMENTS

| | | | | |
|---|---|---|---|---|
| 7,826,331 | B2 | 11/2010 | Kokado | ............... 369/112.29 |
| 2003/0214460 | A1* | 11/2003 | Kovacs | ............. G02B 26/0833 |
| | | | | 345/32 |
| 2005/0254101 | A1* | 11/2005 | Chen | ................. G02B 27/0018 |
| | | | | 358/474 |
| 2009/0046561 | A1* | 2/2009 | Kokado | ................... G11B 7/22 |
| 2011/0141537 | A1* | 6/2011 | Iwasaki | ............... G02B 26/105 |
| | | | | 359/223.1 |
| 2015/0096181 | A1* | 4/2015 | Plangger | ............. G02B 26/105 |
| | | | | 33/290 |
| 2020/0322488 | A1 | 10/2020 | Takahashi | |

FOREIGN PATENT DOCUMENTS

| | | | |
|---|---|---|---|
| JP | 2000-134413 | | 5/2000 |
| JP | 2001022009 A | * | 1/2001 |
| JP | 2004-194204 | | 7/2004 |
| JP | 2004-297638 | | 10/2004 |
| JP | 2004297638 A | * | 10/2004 |
| JP | 2007-207303 | | 8/2007 |
| JP | 2009-238286 | | 10/2009 |

* cited by examiner

IMAGE READING APPARATUS AND IMAGE FORMING APPARATUS HAVING A RECTANGULAR MIRROR AND A CASING FOR THE MIRROR AND AN IMAGE SENSOR, WHEREIN OPPOSITE ENDS OF THE MIRROR ARE BONDED TO THE CASING WITH ADHESIVES THAT DIFFER FROM EACH OTHER IN HARDNESS

FIELD OF THE INVENTION AND RELATED ART

The present invention relates to an image reading device for reading an image on a sheet. It also relates to an image forming apparatus.

There have been widely known an image reading apparatus which is capable of reading the information of an original (sheet) on an original placement plate, and an image forming apparatus equipped with an image reading apparatus. This type of image reading apparatus reads the image information of an original on the original placement plate, by illuminating the original, guiding the light reflected by the original to a photographic element such as a CCD by way of a combination of mirrors and lenses.

In the case of the image reading apparatus disclosed in Japanese Laid-open Patent Application No. 2004-297638, mirrors are attached to a mirror holding member with adhesive. Therefore, it is possible that the mirrors will distort because of the difference between the mirror holding member and mirrors, in the amount of change in their measurements, which is caused by the changes in temperature. If distortion occurs to mirrors, it is difficult for an image reading apparatus to accurately read the information of an original.

SUMMARY OF THE INVENTION

The present invention is to provide an image reading apparatus which remains stable in the level of accuracy at which it can read the information of the image of an original, regardless of changes in temperature, and also, an image forming apparatus equipped with such an image reading apparatus.

According to an aspect of the present invention, there is provided an image reading apparatus comprising an illuminating portion configured to illuminate an original: a reflection member configured to reflect light reflected by the original; a reading portion configured to read the light reflected by said reflection member; a holding member holding said reflection member; a first bonding portion connecting said holding member and one end portion of said reflection member in a direction along a reflecting surface of said reflection member; and a second bonding portion connecting said holding member and the other end portion of said reflection member in the direction along the reflecting surface of said reflection member, wherein said second bonding portion has a hardness less than that of said first bonding portion.

Further features of the present invention will become apparent from the following description of exemplary embodiments with reference to the attached drawings.

BRIEF DESCRIPTION OF THE DRAWINGS

Part (a) of FIG. 2 is a perspective view of the image reading apparatus in the first embodiment, and part (b) of FIG. 2 is a perspective view of the reading unit of the image reading apparatus.

Part (a) of FIG. 4 is a perspective view of the reading unit as seen from the back side of the adjustment mirror, and part (b) of FIG. 4 is a perspective view of the reading unit as seen from a different direction from the one in part (a) of FIG. 4.

Part (a) of FIG. 5 is a sectional view of the adjustment mirror, and part (b) of FIG. 5 is an enlarged view of the adjustment mirror.

DESCRIPTION OF THE EMBODIMENTS

Hereinafter, one of the preferred embodiments of the present invention is described with reference to appended drawings.

[Overall Structure of Printer]

Figure 1:
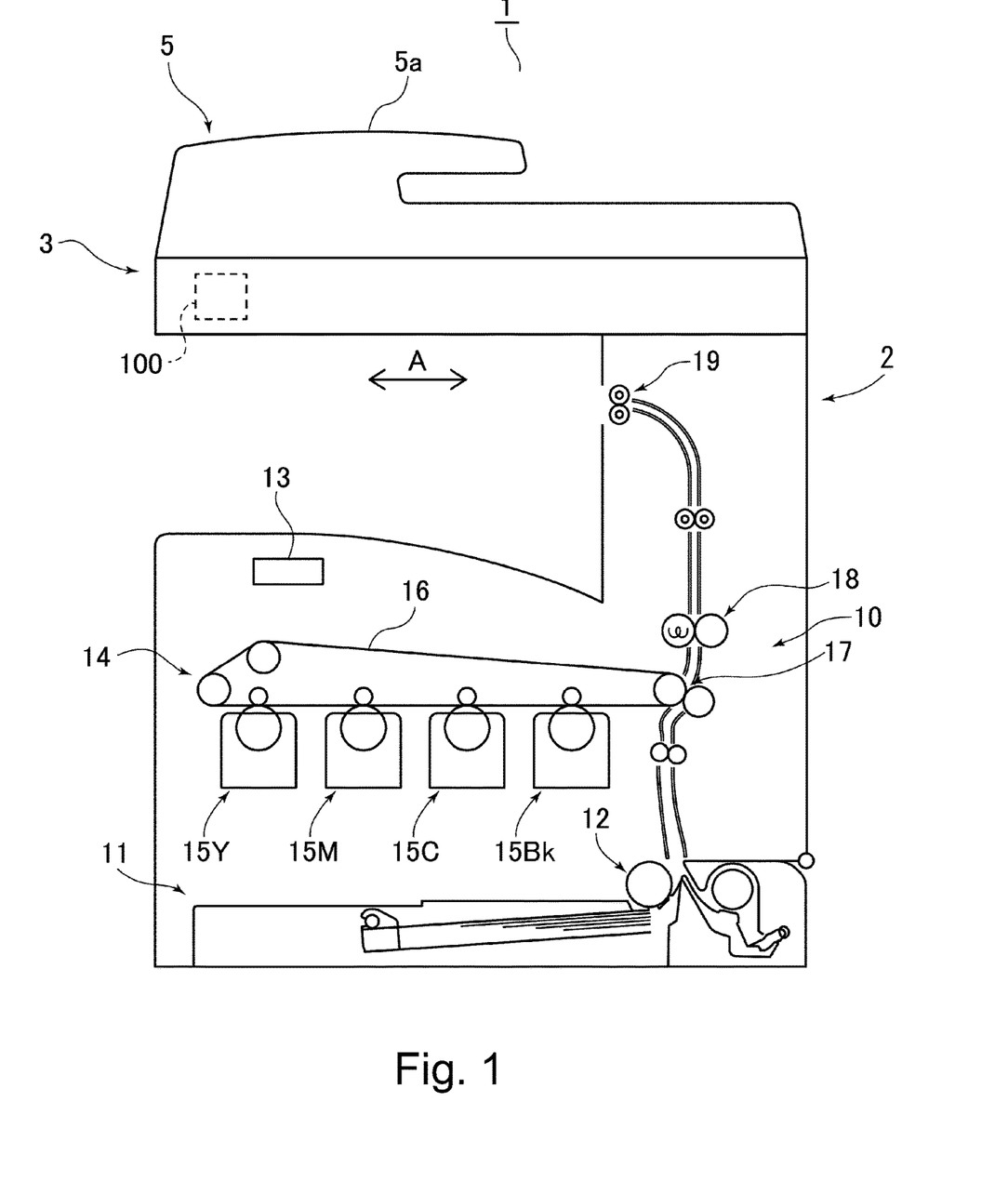
FIG. 1 is a schematic view of the printer in the first embodiment of the present invention.

FIG. 1 is a drawing of a printer 1, as an example of an image forming apparatus, in this embodiment. Referring to FIG. 1, the printer 1 has: an apparatus main assembly 2, an image reading apparatus 3 which is positioned in the top portion of the apparatus main assembly 2 to read the image information of an original; an automatic original conveying apparatus 5 (ADF: Automatic Document Feeder) positioned on the top side of the original reading apparatus 3. In the apparatus main assembly 2, an image forming portion for forming an image on a sheet of recording medium, and a control portion 13, are disposed.

The image forming portion 10 is equipped with an electrophotographic image formation unit 14, and a fixing apparatus 18. The image formation unit 14 has image formation subunits 15Y-15Bk, which correspond to yellow, magenta, cyan, and black colors, respectively, and are aligned in tandem and parallel along an intermediary transfer belt 16 as an intermediary transferring member. The image formation subunits 15Y-15Bk carry out an image forming operation, in response to a command from the control portion 13. To describe in greater detail, as a command for starting an image forming operation is issued, a photosensitive drum, which is a photosensitive member, rotates in each of the image formation subunits 15Y-15Bk, while the peripheral surface of the drum is uniformly charged by the charging apparatus. As the peripheral surface of the drum is uniformly charged, the exposing apparatus forms an electrostatic latent image on the peripheral surface of the drum, by scanning the peripheral surface of the drum with a beam of laser light which it outputs while modulating the beam with the information of the image to be formed, which is transmitted from an image reading apparatus 3 or an external computer. This electrostatic latent image is developed into a visible image (image formed of toner; toner image) by the toner supplied from an unshown developing apparatus. That is, four monochromatic images, which are different in color, are formed on the four photosensitive drums, one for one. Then, the four monochromatic images are sequentially transferred in layers onto the intermediary transfer belt 16.

While the image forming operation described above is carried out, sheets of recording medium stacked in a sheet cassette 11 (or unshown manual feeder tray) are fed one by one into the main assembly 2 of the printer 1, and are conveyed toward the secondary transferring portion 17 of the image forming portion 10. As each sheet of recording medium is fed into the apparatus main assembly 2, it is conveyed to the secondary transferring portion 17, in synchronism with the progression of the image forming operation in each of the image formation subunits 15Y-15Bk. In the secondary transferring portion 17, the four toner images are transferred onto the sheet. After the transfer of the toner images onto the sheet, the sheet is passed to the fixing apparatus 18, in which it is heated and pressed while remaining sandwiched by a pair of rollers. Consequently, the toner images become fixed (welded) to the sheet. Then, the sheet is discharged out of the image forming apparatus by a sheet discharging portion 19, which comprises a pair of rollers, or the like.

[Image Reading Apparatus]

Next, the structure of the image reading apparatus 3 is described in detail. By the way, in this embodiment, a "sheet" includes not only a sheet of ordinary paper, but also, a sheet of special paper such as coated paper, a recording medium such as an envelop and an index paper which is different in shape from an ordinary sheet of paper, a sheet of plastic film for an overhead projector, a sheet of fabric, etc. Further, an original also is an example of sheet. That is, an original can be a sheet of blank paper, a sheet of paper having an image on only one of its surfaces, or a sheet of paper having an image on both of its surfaces.

Figure 2:
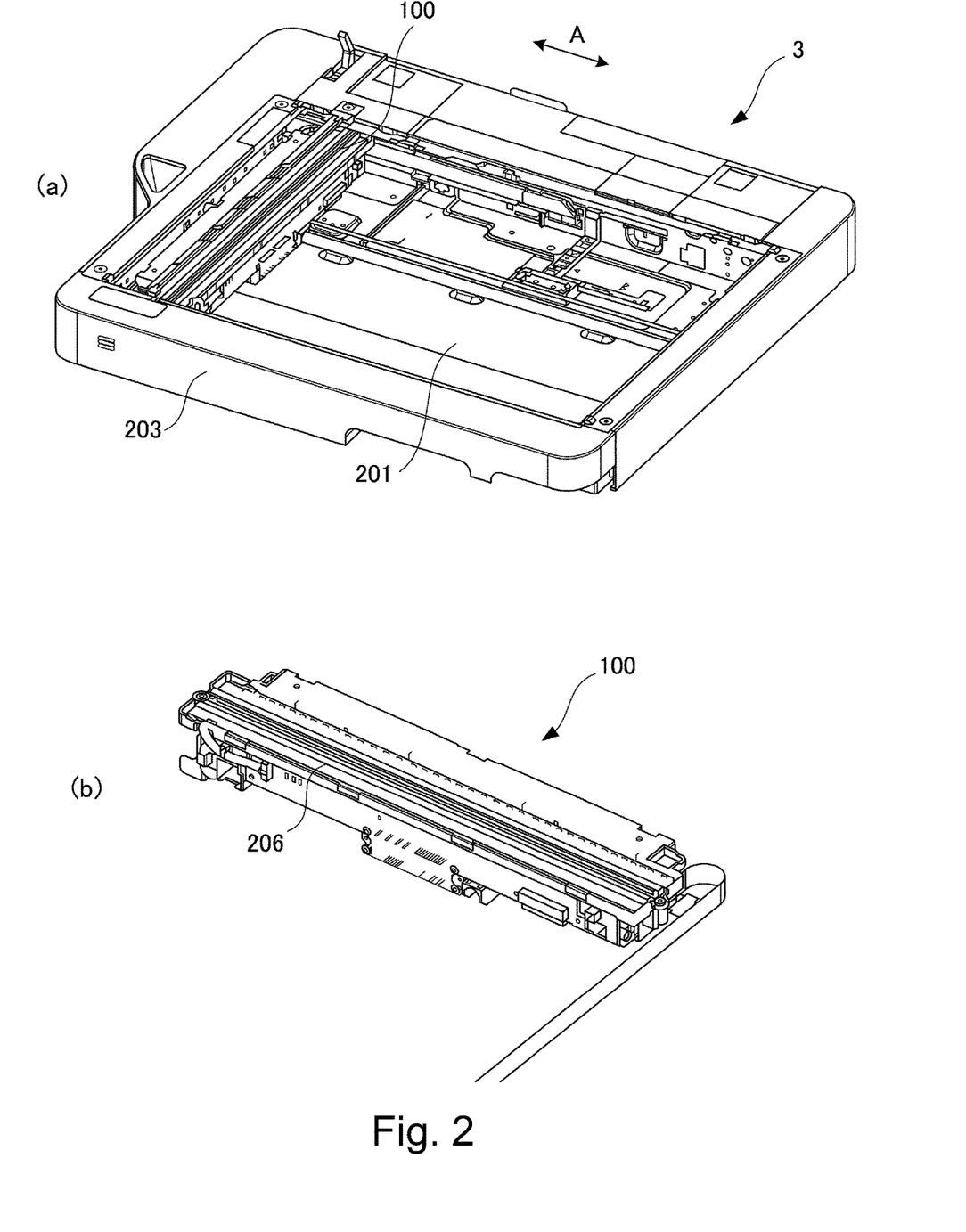

Referring to part (a) of FIGS. 2 and 2(b), the image reading apparatus 3 comprises: a glass platen 201, across which an original is placed; and a reading unit 100, which is on the underside of the glass platen 201 and is movable in the secondary scan direction A. The image reading apparatus 3 is structured so that it can read an original S (obtain information of original S) while the original S is kept stationary, or is moved.

When the image reading apparatus 3 is in a mode in which an original S is kept stationary, its reading unit 100 is moved at a preset constant speed in the secondary scanning direction A along the surface of the glass platen 201 to scan the original S on the glass platen 201 to read the original S, that is, to obtain the information of the image to be formed, line by line. On the other hand, when the image reading apparatus 3 is in a mode in which the original is moved at a preset constant speed, the aforementioned ADF 5 conveys each of the originals S on the original placement tray 5a (FIG. 1) while the reading unit 100 is stationarily positioned so that the center of an unshown reading roller of the ADF 5 overlaps with the reading line. As the image is read (information of image is obtained) by the image reading apparatus 3, the information of the image to be formed is converted into a toner image on a sheet of recording medium by the image forming portion 10, or outputted as image information to an external computer.

The reading unit 100 has a boxy casing 101, as a holding member, which is in connection to a driving motor 202 by way of a timing belt 212. The boxy casing 101 is formed of synthetic resin, for example. It can be moved in parallel to the glass platen 201, that is, in the secondary scan direction A, along a guide rail 213, by driving the driving gear 202. When the image reading apparatus 3 is in the mode in which an original is kept stationary, the driving gear 202 is driven to move the reading unit 100 in the secondary scan direction A.

Further, the boxy casing 101 holds: an illumination unit 206 as an illuminating means; a mirror 103 as the first reflective member; three mirrors 102 as the second reflective members; a lens unit 204; and an image sensor 205 as a reading means having an image-capturing element, etc. The illumination unit 206 has a light source such as an LED or Xenon lamp, for example. It illuminates the downwardly facing surface of an original S placed on the glass platen 201.

The mirrors 102 and 103 are different in material, more concretely, different in coefficient of linear expansion, from the boxy casing 101. More specifically, the mirrors 102 and 103 are formed of such material as glass that is lower in the coefficient of linear expansion than the material for the boxy casing 101. They have reflective surfaces 102a and 103a, respectively, which are high is optical reflectivity.

As light is emitted from the illumination unit 206, it is reflected by the downwardly facing surface of the original, it (reflected light) is reflected by the reflective surface 102a of each of the three mirrors 102 and 103, being thereby guided to the lens unit 204. The mirrors 102 are positioned on the upstream of the mirror 103 in the light path 207 from the original S to the lens unit 204. That is, the mirror 103 is positioned most downstream among the mirrors which are in the light path 207 from the original S to the lens unit 204, being position in a manner to oppose the lens unit 204.

Figure 3:
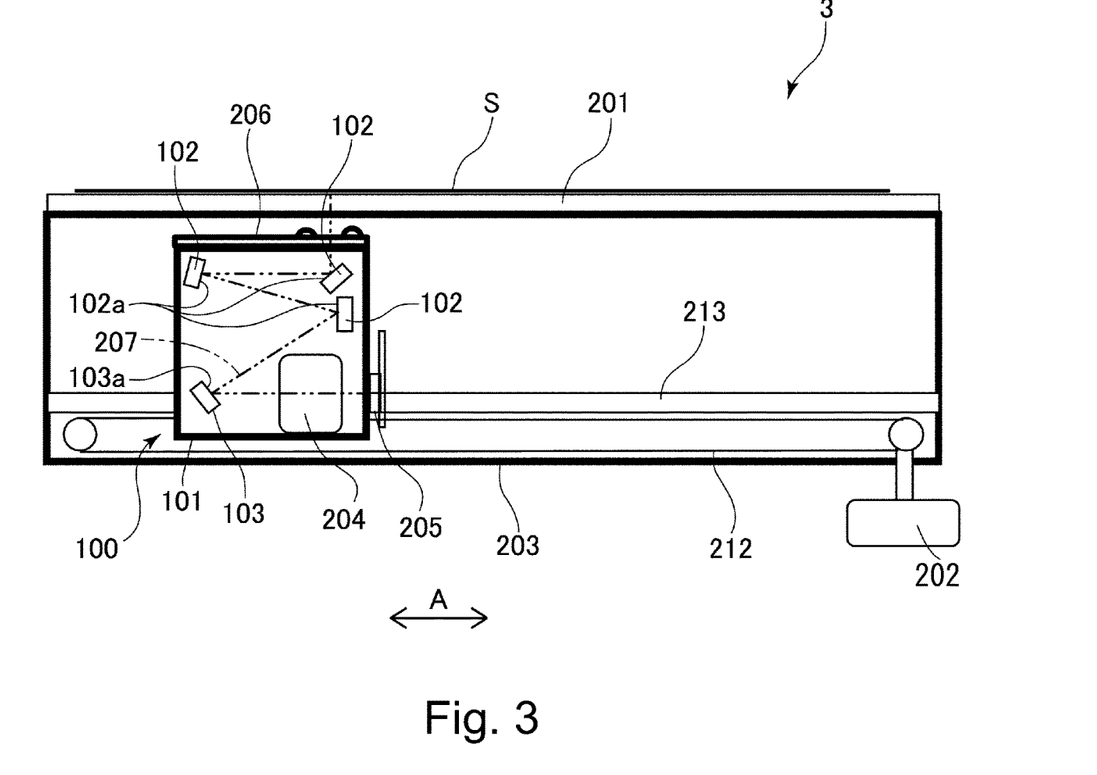
FIG. 3 is a schematic view of the image reading apparatus.
Figure 4:
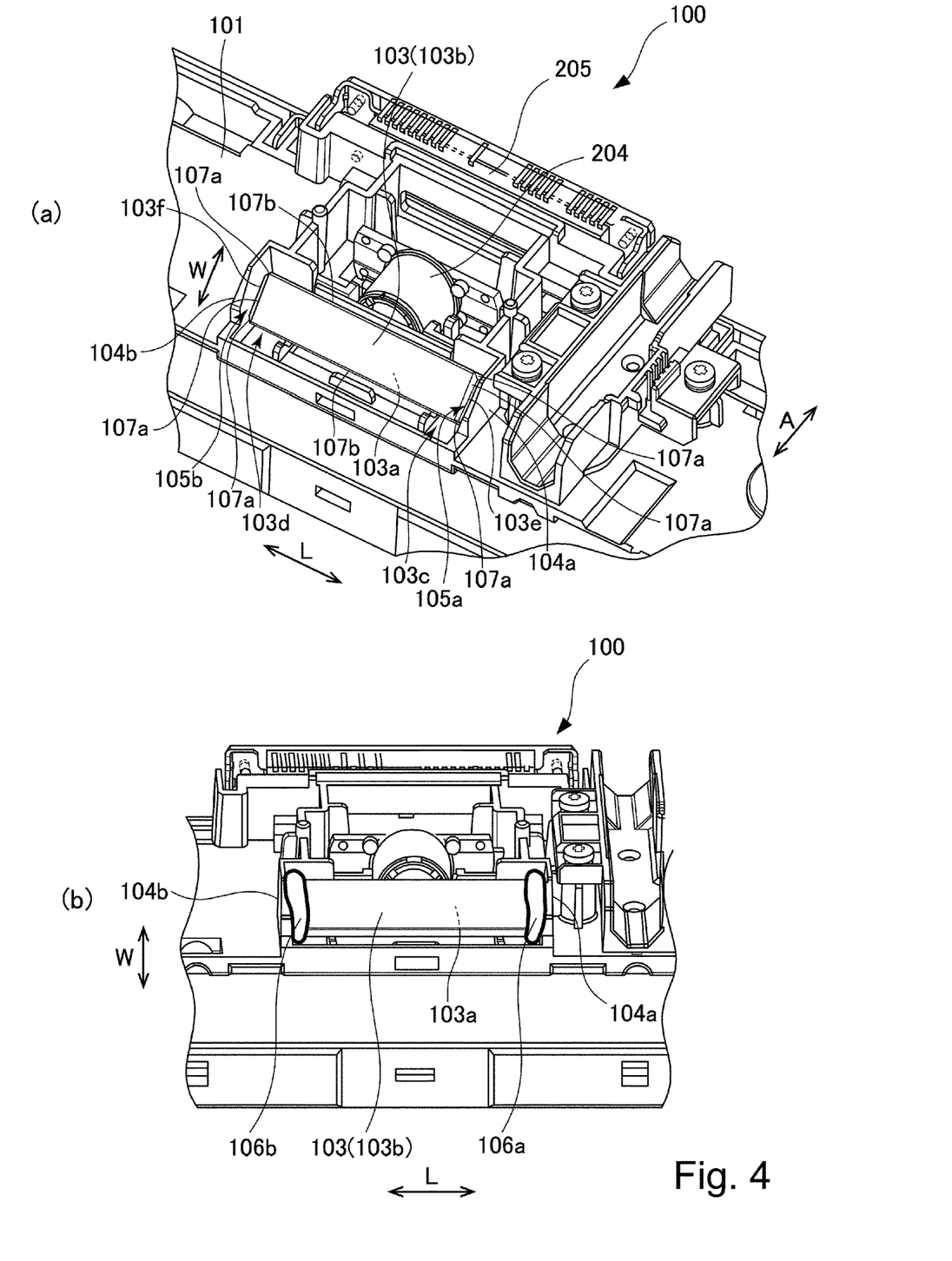

Further, the mirrors 102 and 103 are in the form of a roughly rectangular piece of plate. In terms of their position in the light path 207 from the original S to the lens unit 204, the more downstream in position they are, the smaller in the size of their reflective surfaces (102a and 103a). More concretely, the form of the mirrors 102 and 103 are such that in terms of the light path 207 from the original S to the lens unit 204, the more downstream they are, the less they are in the dimension in terms of the direction parallel to the lengthwise direction of the reflective surface 103a (depthwise direction in FIG. 3; part (a) of FIG. 4.

The lens unit 204 focuses the light guided thereto from the original S by way of mirrors 102 and 103, on the image sensor 205, forming thereby an image of the original S on the image sensor 205. Thus, this image is converted into a sequence of voltage (photoelectric conversion). That is, the image of the original S is read.

[Mirror-Holding Structure]

Next, the boxy casing 101 is described in detail about its mirror-holding structure. As described above, the mirrors 102 and 103 are different in coefficient of linear expansion from the boxy casing 101. Further, the components of the image reading apparatus 3 are different in material, being therefore different in coefficient of linear expansion. Therefore, if the mirrors 102 and 103 are immovably attached to the boxy casing 101, distortion sometimes occurs to the boxy casing 101, and the reflective surfaces 102a and 103a of the mirrors 102 and 103, respectively, as the image reading apparatus 3 changes in temperature. As distortion occurs to the boxy casing 101 and/or the reflective surfaces 102a and 103 of the mirrors 102 and 103, respectively, it is unlikely for the original S to be accurately read; it is unlikely for the information of the original S to be accurately obtained.

In this embodiment, therefore, the mirror 102 is kept pressed toward the boxy casing 101 by an unshown leaf spring in such a direction that intersects with the reflective surface 102a. Further, it is held so that it is allowed to move in the direction which is parallel to the reflective surface 102a. Therefore, not only is the mirror 102 positioned relative to the boxy casing 101 in terms of the direction that intersects with the reflective surface 102a, but also, distortion of the boxy casing 101, and that of the reflective surface 102a of the mirror 102, which occur as the boxy casing 101 and mirrors 102 and 103 change in temperature. Thus, the image reading apparatus 3 in this embodiment can read the original S at a higher level of accuracy than any conventional one.

Also, in this embodiment, the mirror 103 is held to the boxy casing 101 by being bonded to the boxy casing 101 with adhesive. More concretely, the lengthwise end portions of the mirror 103 in terms of the direction which is parallel to the reflective surface 103a of the mirror 103, are bonded to the boxy casing 101 with the first and second adhesives.

Figure 5:
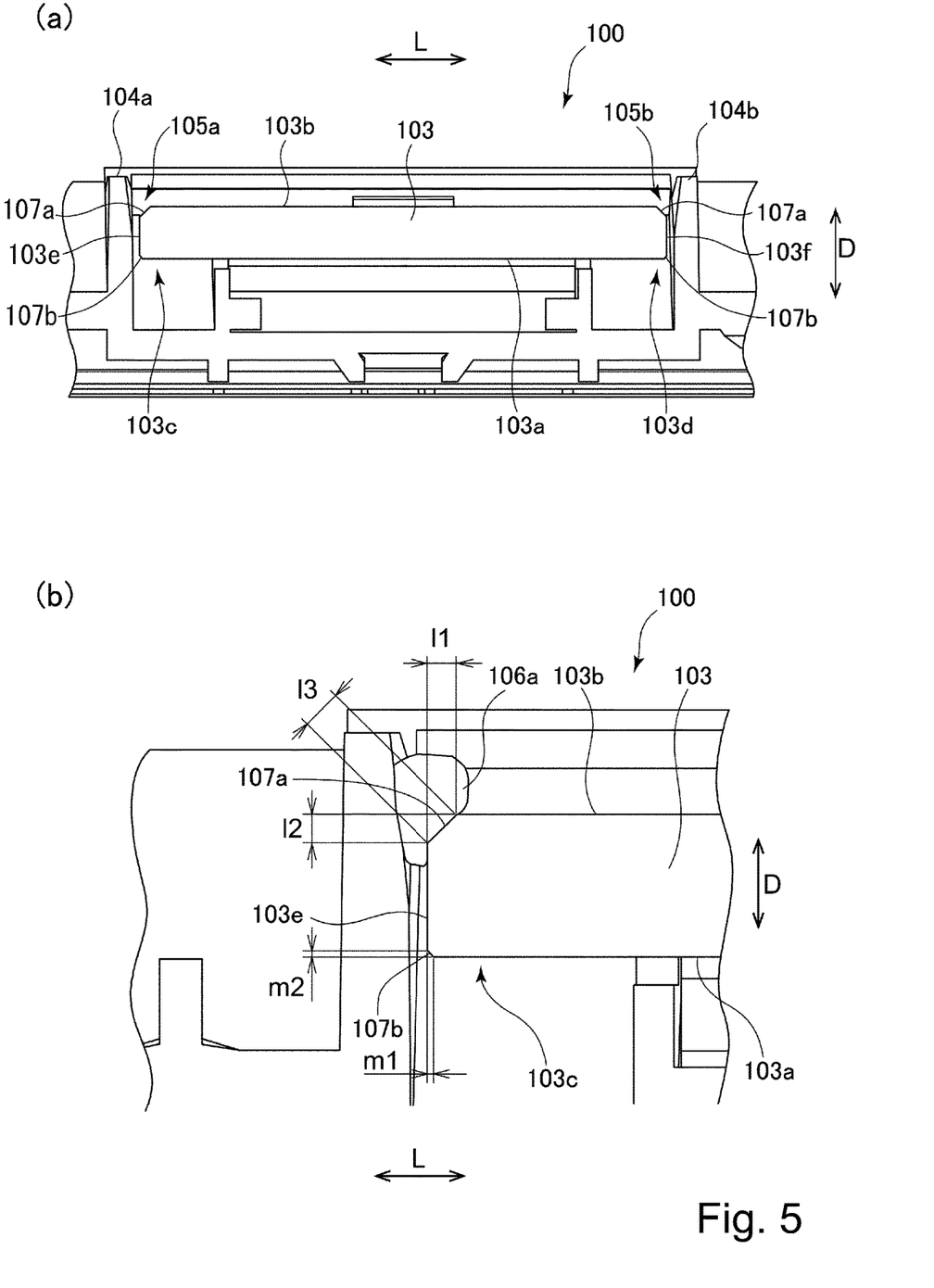

Next, the concrete structure which holds the mirror 103 is described. Part (a) of FIGS. 4 and 4(b) are perspective views of the reading unit 100 as seen from the back surface 103b side of the mirror 103, which is the opposite surface side of the mirror 103 from the reflective surface 103a, respectively. Part (a) of FIG. 5 is a sectional view of the mirror 103 and its adjacencies. Referring to part (a) of FIGS. 4, 4(b) and 5(a), the boxy casing 101 has a wall 104a, which is positioned in the adjacencies of one 103c of the lengthwise end portions of the mirror 103, in terms of the lengthwise direction L, and a wall 104b which is positioned in the adjacencies of the other end portion 103d.

The walls 104a and 104b are shaped and positioned so that their lengthwise direction intersects with the reflective surface 103a of the mirror 103, and also, so that they oppose each other, with the presence of the mirror 103 between them. Further, the wall 104a and lengthwise end portion 103c are indirectly connected to each other by way of the first adhesive portion 106a, which is hardened first adhesive, whereas the wall 104b and lengthwise end portion 103c are indirectly connected to each other by way of the second adhesive portion 106b, which is hardened second adhesive. In other words, the wall 104a and lengthwise end portion 103c are positioned so that they do not directly contact with each other, and so are the wall 104b and lengthwise end portion 103d.

Both the first and second adhesives contain photosetting synthetic resin. Before they set, they have fluidity. As they are exposed to ultraviolet ray, for example, they change in state from the one in which they have a high level of fluidity, to the one in which they have a lower level of fluidity. Further, the second adhesive is lower than the first adhesive in hardness after they hardened. That is, the second adhesive portion 106b is lower in hardness than the first adhesive portion 106a. More concretely, the first adhesive portion 106a is no less than 20 in hardness (durometer type D). The second adhesive portion 106b is no less than 20 (durometer type A) and no more than 90, in hardness (durometer type D). Even more concretely, the first adhesive portion 106a is roughly 70 in hardness (durometer type D), and the second adhesive portion 106b is roughly 80 in hardness (durometer type A). By the way, durometer type A hardness and durometer type B hardness are based on JIS K 6253-3:2012, ISO7619-1.

As the image reading apparatus 3 changes in temperature, not only is the position of the end portion 103c and the position of the end portion 104e relative to each other maintained by the first adhesive portion 106a, but also, the second adhesive portion 106b deforms. Therefore, the distance between the end portion 103d and wall 104b changes. That is, the position of the end portion 103c and that of the wall 104a relative to each other is set by the first adhesive portion 106a, and the change in the position of the mirror 103 relative to the boxy casing 101, and the change in the size of the mirror 103 in terms of the lengthwise direction L, which are attributable to the change in the temperature of the image reading apparatus 3, are absorbed by the second adhesive portion 106b. In this embodiment, therefore, the distortion of the boxy casing 101, and that of the reflective surface 103a of the mirror 103, which are attributable to the change in the temperature of the image reading apparatus 3, are prevented. That is, it is prevented that as the image reading apparatus 3 changes in temperature, it reduces in accuracy.

Generally speaking, a piece of plate formed of glass or the like material is put though the so-called chamfering to improve its edge portions in strength. That is, the edge portions of the plate are slightly shaved at roughly 45-angle relative to the adjacent surfaces of the plate to provide a small flat (curved) surface between the adjacent two surfaces of the plate. However, if the surface which resulted by chamfering is small, it is difficult to make adhesive to flow into the area (gap) between the mirrors and boxy casing 101 when adhering the mirrors to the boxy casing 101, although how adhesive flows into the gap depends on the viscosity of the adhesive, and/or the method used to apply the adhesive. Therefore, it sometimes occurs that the mirrors fail to be firmly adhered.

In this embodiment, therefore, at least a part of one of its edges which are intersectional to the lengthwise direction L is chamfered more than the other parts. More concretely, among the edges of end surfaces 103e and 103f of the mirror 103 in terms of the lengthwise direction L, those which will be next to the first adhesive portion 106a and second adhesive portion 106b, with which the mirror 103 are adhered to the boxy casing 101, are chamfered by a greater amount than the other edges.

Even more concretely, among the four edges of the end surfaces 103e and 103f as seen in the lengthwise direction L, one on the back surface 103b side, and two edges in terms of the widthwise direction W, are chamfered more than the rest. Thus, the surfaces 107a which resulted from the chamfering are greater in size than the surfaces 107b which resulted from the chamfering. In other words, among the four edges of the end surfaces 103e and 103f of the mirror 103 as seen in the lengthwise direction L, three edges except for the edge on the reflective surface 103a side are chamfered by a greater amount than other edges, having the surface 107a, which is greater in size than the surface 107b which resulted from the chamfering of the other edges.

That is, referring to part (b) of FIGS. 5, 11 and 12, by which the edge of the mirror 103, which corresponds to the surface 107a, is chamfered is greater than m1 and m2, by which the edge which corresponds to the surface 107b, is chamfered. For example, l1 and l2 are no less than 1 mm (no less than C1). Further, for example, the width of the surface 107a, which resulted from the chamfering is no less than 1.4 mm. By the way, the widthwise direction W is intersectional to the lengthwise direction L, and also, the thickness direction D of the plate. Further, it is not mandatory that the end surfaces of the mirror 103 in terms of the lengthwise direction L are perpendicular to the reflective surface, back surface, and end surfaces in terms of the widthwise direction W, of the mirror 103. Further, it is not mandatory that the angle between the surfaces which result from the chamfering, relative to the end surfaces, reflective surface, and back surface of the mirror 103 is 45°.

Since the aforementioned edges of the mirrors are chambered as described above, it is easier for the first and second adhesives to flow into the gaps 105a and 105b (part (b) of FIG. 5) between the mirror 103 and boxy casing 101 in terms of the lengthwise direction L, making it possible to assure that the mirror 103 remains reliably adhered.

[Procedure for Attaching Mirror with Adhesive]

Next, the procedure for attaching the mirror 103 to the boxy casing 101 with adhesive is described. To begin with, the illumination unit 206, mirrors 102, lens unit 204, and image sensor 205 are attached to the boxy casing 101. Then, the mirror 103 is held by a manipulator, and is positioned between the end portion 104e and 104b the walls with the use of the manipulator. Then, the mirror 103 is adjusted in attitude with the use of the manipulator so that the mirror 103 is properly angled relative to the lens unit 204 and image sensor 205.

While the mirror 103 is adjusted in angle, the manipulator is controlled so that it holds the mirror 103 in a position in which the mirror 103 does not contact the boxy casing 101, that is, the gaps 105a and 105b are provided between the mirror 103 and boxy casing 101 in terms of the lengthwise direction L. This procedure prevents the problem that while the mirror 103 is adjusted in angle, the mirror 103 and boxy casing 101 come into contact with each other, which results in misadjustment of the mirror 103 in angle.

After the adjustment of the mirror 103 in angle, the first and second adhesives are applied in a manner to be made to flow into the gaps 105a and 105b, respectively. After the application of the first and second adhesives, the first and second adhesives are irradiated with ultraviolet ray or the like to be hardened. As described above, in this embodiment, the mirror 103 is made as such a mirror that can be adjusted in angle while the image reading apparatus 3 is assembled. By the way, generally speaking, the process for adjusting a mirror in angle, which is disclosed in Patent Document No. 1 is manually carried out by an assembler. In this embodiment, in stead of manually adjusting a mirror in angle with the use of small screws, a mirror held by a manipulator at an adjusted angle is fixed to the boxy casing 101 with adhesive as introduced as an example of the aforementioned procedure. In other words, this embodiment can contribute to the automation of the process for attaching the mirror 103 to the boxy casing 101.

In the case of the image reading apparatus 3 in this embodiment, which is structured as described above, the second adhesive portion between the boxy casing 101 and the end portion 103d of the mirror 103 in terms of the lengthwise direction L is lower in hardness than the first adhesive portion between the end portion 103c of the mirror 103 in terms of the lengthwise direction L. Generally speaking, the material for the mirror 103 is different from that for the mirror holding member, being therefore different in coefficient of linear expansion. Therefore, it occurs sometimes that the mirror and mirror holding member are made to deform by the change in ambient temperature and/or the heat generation in the image reading apparatus 3, which in turn reduces the image reading apparatus 3 in accuracy. In this embodiment, the second adhesive portion is lower in hardness than the first adhesive portion. Therefore, the distortion of the boxy casing 101 and/or mirror 103, which might occur due to the aforementioned change in temperature, is minimized. Therefore, the image reading apparatus 3 is prevented from reducing in the accuracy with which it reads the original S, that is, the accuracy with which it obtains the information of the original S, by the change in the ambient temperature.

Further, the mirror 103 and boxy casing 101 are indirectly connected to each other with the presence of the second adhesive portion 106b. Therefore, it is possible to prevent the mirror 103 and boxy casing 101 from coming in contact with each other when the mirror 102 is adjusted in angle by the manipulator, for example. Therefore, this embodiment can provide an image reading apparatus which can more accurately read the original S than any conventional one. In the case of an image reading apparatus, the mirrors of which are attached with small screws, if small screws become loose, the mirrors change in angle. In this embodiment, however, the mirrors are attached with adhesive. Therefore, there is no possibility that the mirrors will change in angle due to the loosening of small screws.

[Modifications]

By the way, in this embodiment, the mirror 103 which is positioned most downstream in the pass of the light reflected from the original S is the adjustment mirror which is to be bonded to the boxy casing 101. This embodiment, however, is not intended to limit the present invention in scope. That is, the adjustment mirror as the first reflective member may be any one of the multiple reflective members positioned in the light path from an original to the reading means. Further, the multiple reflective members positioned in this light path may be bonded to the boxy casing.

Further, in this embodiment, the mirror 103 is bonded to the boxy casing 101 by its end portions 103c and 103d in terms of the lengthwise direction L. This embodiment, however, is not intended to limit the present invention in scope. That is, all that is necessary is that the mirror as the first reflective member is bonded to the boxy casing 101 by the first and second end portions in terms of the direction parallel to the reflective surface. For example, it may be bonded by both of the widthwise end portions, or by three or more portions. Further, the mirror does not need to be rectangular. Moreover, the reflective surface does not need to be flat; it may be curved.

Moreover, in this embodiment, the mirror 103 is formed of glass, whereas the boxy casing 101 is formed of synthetic resin. This embodiment, however, is not intended to limit the present invention in scope in terms of the materials for the mirror 103 and boxy casing 101. That is, all that is necessary is that the material for the mirror and that for the holding member, are different in coefficient of linear expansion. For example, the holding member may be formed of such metallic material as stainless steel and plated steel plate.

Further, in this embodiment, the mirrors 102 and 103 are attached to the reading unit 100 which moves in the secondary scan direction A. This embodiment, however, is not intended to limit the present invention is scope. That is, parts of the mirrors may be fixed to the main assembly 203 (FIG. 3) of the image reading apparatus 3, which holds the glass platen, etc. Further, the image reading apparatus 3 may be structured so that the mirrors are different in speed.

Further, in this embodiment, the mirror 103 is given such a shape that the surfaces which resulted from the chamfering of the edges of the mirror 103, by which the mirror 103 is connected to the boxy casing 101 with the first and second adhesives, are larger than the surfaces which resulted from the chamfering of the edges of the end surfaces 103e and 103f. This embodiment, however, is not intended to limit the present invention is scope. That is, all that is necessary is that the mirror as the first reflective member is shaped so that their edges by which the mirror is connected to the boxy casing 101 can provide a sufficient amount of adhesion between the mirror and the walls of the boxy casing. That is, portions of the edges of the mirrors, by which the mirror is connected to the boxy casing with the first and second adhesives do not need to be chamfered.

Further, in this embodiment, the image forming apparatus was the printer 1 equipped with the image reading apparatus 3. This embodiment, however, is not intended to limit the present invention in scope. That is, the present invention is applicable to any image forming apparatus which forms an image on a sheet of recording medium, based on the image information inputted from an external PC, or the information obtained by the reading of an original. For example, the present invention is also applicable to a copying machine, a facsimileing machine, a multifunction machine, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-216150 filed on Nov. 29, 2019, which is hereby incorporated by reference herein in its entirety.

What is claimed is:

1. An image reading apparatus comprising:
    a light source configured to illuminate an original;
    a mirror configured to reflect light reflected by the original, said mirror being a rectangular plate member which has a reflecting surface reflecting light, a back surface positioned in a back side of said reflecting surface, a first side surface positioned in one end of said mirror in a longitudinal direction, a second side surface positioned in the other end portion of said mirror in the longitudinal direction, a first chamfered portion formed on an edge portion of said back side in said first side surface and a second chamfered portion formed on an edge portion of said back side in said second side surface;
    an image sensor configured to read the light reflected by said mirror; and
    a casing configured to hold said mirror and said image sensor, said casing having a first wall portion opposing said first side surface of said mirror in the lengthwise direction and a second wall portion opposing said second side surface of said mirror in the lengthwise direction,
    wherein said first side surface and said first chamfered portion are bonded to said first wall portion with a first adhesive and said second side surface and said second chamfered portion are bonded to said second wall portion with a second adhesive which has a hardness less than that of said first adhesive.

2. An apparatus according to claim 1, wherein said casing is made of synthetic resin material.

3. An apparatus according to claim 1, wherein said mirror is a first mirror, and said apparatus further comprises a second mirror provided upstream of said first mirror in an optical path from the original to said image sensor, wherein said first mirror has a reflecting surface with an area smaller than that of said second mirror.

4. An apparatus according to claim 1, wherein said first adhesive and said second adhesive comprise synthetic resin material.

5. An apparatus according to claim 1, wherein said first adhesive and said second adhesive comprise light curing synthetic resin material.

6. An apparatus according to claim 1, wherein said first adhesive has a durometer D hardness not less than 20.

7. An apparatus according to claim 6, wherein said second adhesive has a durometer D hardness not less than 20 and less than 90.

8. An apparatus according to claim 1, wherein said mirror has a linear expansion coefficient which is different from that of said casing.

9. An apparatus according to claim 1, wherein said mirror and said casing are out of contact from each other.

10. An apparatus according to claim 1, further comprising a platen configured to support the original, and a read unit including said light source, said mirror, said image sensor and said casing, wherein said read unit is movable along said platen to scan the original to read image information.

11. An image forming apparatus comprising:
    a light source configured to illuminate an original;
    a mirror configured to reflect light reflected by the original, said mirror being a rectangular plate member which has a reflecting surface reflecting light, a back surface positioned in a back side of said reflecting surface, a first side surface positioned in one end of said mirror in a longitudinal direction, a second side surface positioned in the other end portion of said mirror in the longitudinal direction, a first chamfered portion formed on an edge portion of said back side in said first side surface and a second chamfered portion formed on an edge portion of said back side in said second side surface;
    an image sensor configured to read the light reflected by said mirror;
    a casing configured to hold said mirror and said image sensor, said casing having a first wall portion opposing said first side surface of said mirror in the lengthwise direction and a second wall portion opposing said second side surface of said mirror in the lengthwise direction,
    wherein said first side surface and said first chamfered portion are bonded to said first wall portion with a first adhesive and said second side surface and said second chamfered portion are bonded to said second wall portion with a second adhesive which has a hardness less than that of said first adhesive; and
    an image former configured to form an image on a sheet on the basis of image information read by said image sensor.

12. An apparatus according to claim 1,
    wherein said first adhesive is applied in a gap between said first side surface and said first wall portion, and said second adhesive is applied in a gap between said second side surface and said second wall portion.

13. An apparatus according to claim 1,
    wherein said first chamfered portion and second chamfered portion are chamfered by a greater amount in widthwise size than edge portions of said reflecting surface side in said first side surface and said second side surface.

14. An apparatus according to claim 13, wherein a width of said edge portions of said back side in said first side surface and said second side surface the surface is no less than 1.4 mm.

* * * * *